(12) United States Patent
Fukumoto et al.

(10) Patent No.: US 8,561,773 B2
(45) Date of Patent: Oct. 22, 2013

(54) DRIVE DEVICE

(75) Inventors: Ryoichi Fukumoto, Nagoya (JP);
Tomoaki Nishimura, Kariya (JP);
Tsutomu Takeuchi, Gamagori (JP);
Hiroyasu Onai, Isesaki (JP); Takashi Yamaguchi, Kiryu (JP)

(73) Assignees: Aisin Seiki Kabushiki Kaisha,
Kariya-Shi, Aichi-Ken (JP); Ogura Clutch Co., Ltd., Kiryu-Shi, Gunma-Ken (JP)

( * ) Notice: Subject to any disclaimer, the term of this patent is extended or adjusted under 35 U.S.C. 154(b) by 1419 days.

(21) Appl. No.: 11/997,812

(22) PCT Filed: Jul. 26, 2006

(86) PCT No.: PCT/JP2006/314798
§ 371 (c)(1),
(2), (4) Date: Feb. 4, 2008

(87) PCT Pub. No.: WO2007/018036
PCT Pub. Date: Feb. 15, 2007

(65) Prior Publication Data
US 2010/0155191 A1 Jun. 24, 2010

(30) Foreign Application Priority Data

Aug. 5, 2005 (JP) ................. 2005-228711

(51) Int. Cl.
*F16D 27/112* (2006.01)
*F16D 27/14* (2006.01)
*G01B 7/30* (2006.01)

(52) U.S. Cl.
USPC ............... 192/84.961; 192/30 W; 324/207.25

(58) Field of Classification Search
USPC ......... 192/30 W, 84.1, 84.961; 324/174, 160, 324/179, 207.25
See application file for complete search history.

(56) References Cited

U.S. PATENT DOCUMENTS 4,940,936 A * 7/1990 Grillo et al. ................. 324/174
5,184,069 A * 2/1993 Adler et al. .............. 324/207.22
(Continued)

FOREIGN PATENT DOCUMENTS

JP 2000-177391 A 6/2000
JP 2000-179233 A 6/2000
(Continued)

OTHER PUBLICATIONS

English Language Translation of International Preliminary Report on Patentability issued in the corresponding International Application. Form PCT/ISA/210 (International Search Report) dated Oct. 31, 2006.

*Primary Examiner* — David D Le
*Assistant Examiner* — Terry Chau
(74) *Attorney, Agent, or Firm* — Buchanan Ingersoll & Rooney PC

(57) ABSTRACT

A drive device is provided with a housing 11 and an electromagnetic clutch mechanism 14 accommodated in the housing. The electromagnetic clutch mechanism 14 is provided with an armature 41 rotatably supported in the housing 11, a rotor 42 arranged to face the armature 41 and rotatably supported in the housing 11, and a coil 46. An annular magnet 44 is fixed on the outer circumference surface of the rotor 42. A sensor 15 arranged inside the housing 11 detects a polarity change of the magnet 44 in association with rotation of the rotor 42. The magnet 44 is provided with an annular wall portion 44b extending toward the armature 41 beyond a surface on which the armature 41 is in contact with the rotor 42 with respect to the axial direction. The annular wall portion 44b is spaced radially outward from the armature 41. The annular wall portion 44b prevents abrasion powder produced on actuation of the electromagnetic clutch mechanism 14 from being scattered.

5 Claims, 4 Drawing Sheets

(56) References Cited

U.S. PATENT DOCUMENTS

| | | | |
|---|---|---|---|
| 6,094,046 A * | 7/2000 | Message et al. | 324/173 |
| 6,397,523 B1 | 6/2002 | Fukumoto et al. | |
| 6,408,573 B1 | 6/2002 | Fukumoto et al. | |
| 6,916,118 B2 * | 7/2005 | Ito | 384/448 |
| 6,964,449 B2 * | 11/2005 | Takeda et al. | 296/146.4 |
| 7,275,629 B2 * | 10/2007 | Fukumoto et al. | 192/84.961 |
| 7,508,193 B2 * | 3/2009 | Yarimizu et al. | 324/174 |
| 2010/0107502 A1 * | 5/2010 | Okada et al. | 49/349 |

FOREIGN PATENT DOCUMENTS

| | | |
|---|---|---|
| JP | 2002-276242 A | 9/2002 |
| JP | 2003-074255 A | 3/2003 |
| JP | 2004-353331 A | 12/2004 |
| JP | 2005337886 A * | 12/2005 |
| WO | WO 2004/106687 A1 | 12/2004 |

* cited by examiner

DRIVE DEVICE

FIELD OF THE INVENTION

The present invention relates to a drive device provided with an electromagnetic clutch mechanism.

BACKGROUND OF THE INVENTION

Conventionally, various types of drive devices are known such as those disclosed in Patent Documents 1 and 2. These drive devices are provided with an electromagnetic clutch mechanism accommodated in a housing. The electromagnetic clutch mechanism is provided with an armature, a rotor, and a coil. A worm wheel is arranged around a rotary shaft rotatably supported by the housing so as to rotate relative to the rotary shaft, and the armature is arranged on one side of the worm wheel in the axial direction and coupled to the worm wheel so as to integrally rotate with the worm wheel. The rotor is arranged to face the armature, supported on the rotary shaft so as to integrally rotate with the rotary shaft, and capable of making frictional engagement with the armature when electricity is supplied to the coil.

Furthermore, an annular magnet is fitted into the outer circumference surface of the rotor. A sensor for detecting a polarity change of the magnet in association with the rotation of the rotor is arranged to face the magnet. The rotor axially coincides with the magnet in the axial direction, by which the electromagnetic clutch mechanism is made small in the axial direction.

When abrasion powder produced on actuation of the electromagnetic clutch mechanism is scattered toward a circuit substrate including the sensor, the abrasion powder may result in a short-circuit breakdown of the sensor. Furthermore, for example, an electronic control unit which is integrally accommodated into a housing is employed, this constitution may result in a short-circuit breakdown of the electronic control unit on which important and delicate components such as a microcomputer are mounted.

Patent Document 1: Japanese Published Laid-Open Patent Publication No. 2000-179233

Patent Document 2: Japanese Published Laid-Open Patent Publication No. 2003-74255

SUMMARY OF THE INVENTION

An objective of the present invention is to provide a drive device capable of preventing scattering of abrasion powder produced on actuation of an electromagnetic clutch mechanism.

In order to achieve the foregoing objective and in accordance with the present invention, a drive device provided with a housing and an electromagnetic clutch mechanism accommodated in the housing is provided. The electromagnetic clutch mechanism is provided with a body to be attracted which is rotatably supported in the housing, a rotating body arranged to face the body to be attracted and also rotatably supported in the housing, and a coil. In association with supply of electricity to the coil, an electromagnetic attraction force is generated between the body to be attracted and the rotating body, by which the body to be attracted makes frictional engagement with the rotating body so that power is transmitted between the body to be attracted and the rotating body. An annular magnet is fixed on the outer circumference surface of the rotating body, and the magnet is provided with a plurality of magnetic poles arranged along the circumferential direction. A sensor is retained on the housing at a position radially outward of the magnet so as to be arranged to face the magnet. The sensor detects a polarity change of the magnet in association with the rotation of the rotating body. The magnet is provided with an annular wall portion extending toward the body to be attracted beyond a surface on which the body to be attracted is in contact with the rotating body with respect to the axial direction. The annular wall portion is spaced radially outward from the body to be attracted.

The drive device may be additionally provided with a controller accommodated in the housing to control the electromagnetic clutch mechanism.

According to the present invention, abrasion powder of a magnetic material produced in association with actuation of the electromagnetic clutch mechanism is attracted by the magnet and also retained in a space formed between the body to be attracted and the annular wall portion and thereby prevented from being scattered. Therefore, it is possible to prevent the abrasion powder from being scattered toward the sensor and also to prevent a short-circuit breakdown of the sensor. Furthermore, in the case where the controller for controlling the electromagnetic clutch mechanism is accommodated in the housing, it is possible to prevent the abrasion powder from being scattered toward the controller and also to prevent a short-circuit breakdown of the controller.

In one aspect of the present invention, the annular wall portion is spaced radially outward from the body to be attracted by forming a recess which is dented radially outward in the inner circumference surface of the magnet. In this instance, it is preferable that the body to be attracted is the same as the rotating body in outer diameter.

According to the above constitution, the body to be attracted is allowed to be in contact with the entire opposing surface of the rotating body. Therefore, it is possible to maximize the size of the area at which the body to be attracted makes frictional engagement with the rotating body and also improve the performance in transmitting power between the body to be attracted and the rotating body.

In another aspect of the present invention, the body to be attracted has a smaller outer diameter than that of the rotating body. In this instance, it is preferable that the magnet has a constant inner diameter all across the axial direction. According to this constitution, the magnet is easily manufactured.

DETAILED DESCRIPTION OF THE PREFERRED EMBODIMENTS

Figure 1:
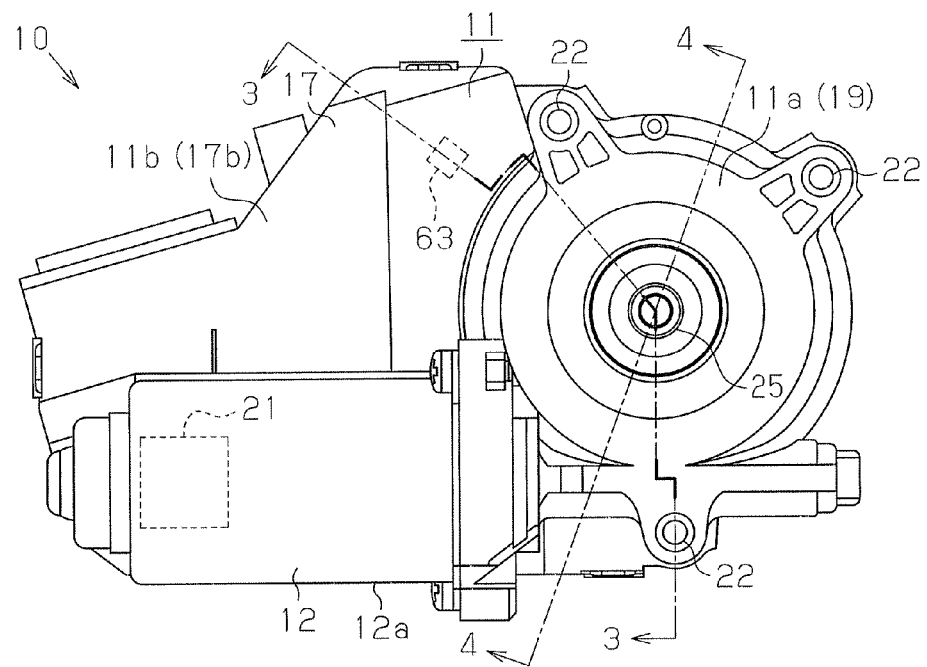
FIG. 1 is a plan view showing a drive device of one embodiment of the present invention.

Hereinafter, a description will be made for one embodiment which specifies the present invention with reference to the drawings.

As shown in FIGS. 1 to 4, a drive device 10 is provided with a housing 11, a motor 12, a reduction mechanism 13, a friction-type electromagnetic clutch mechanism 14, a sensor 15, and an electronic control unit (hereinafter abbreviated as "ECU") 16 as a controller. The reduction mechanism 13 and the electromagnetic clutch mechanism 14 constitute a power transmitting mechanism portion. The housing 11 is provided with a case 17, an ECU cover 18, and a motor housing portion 19.

Figure 3:
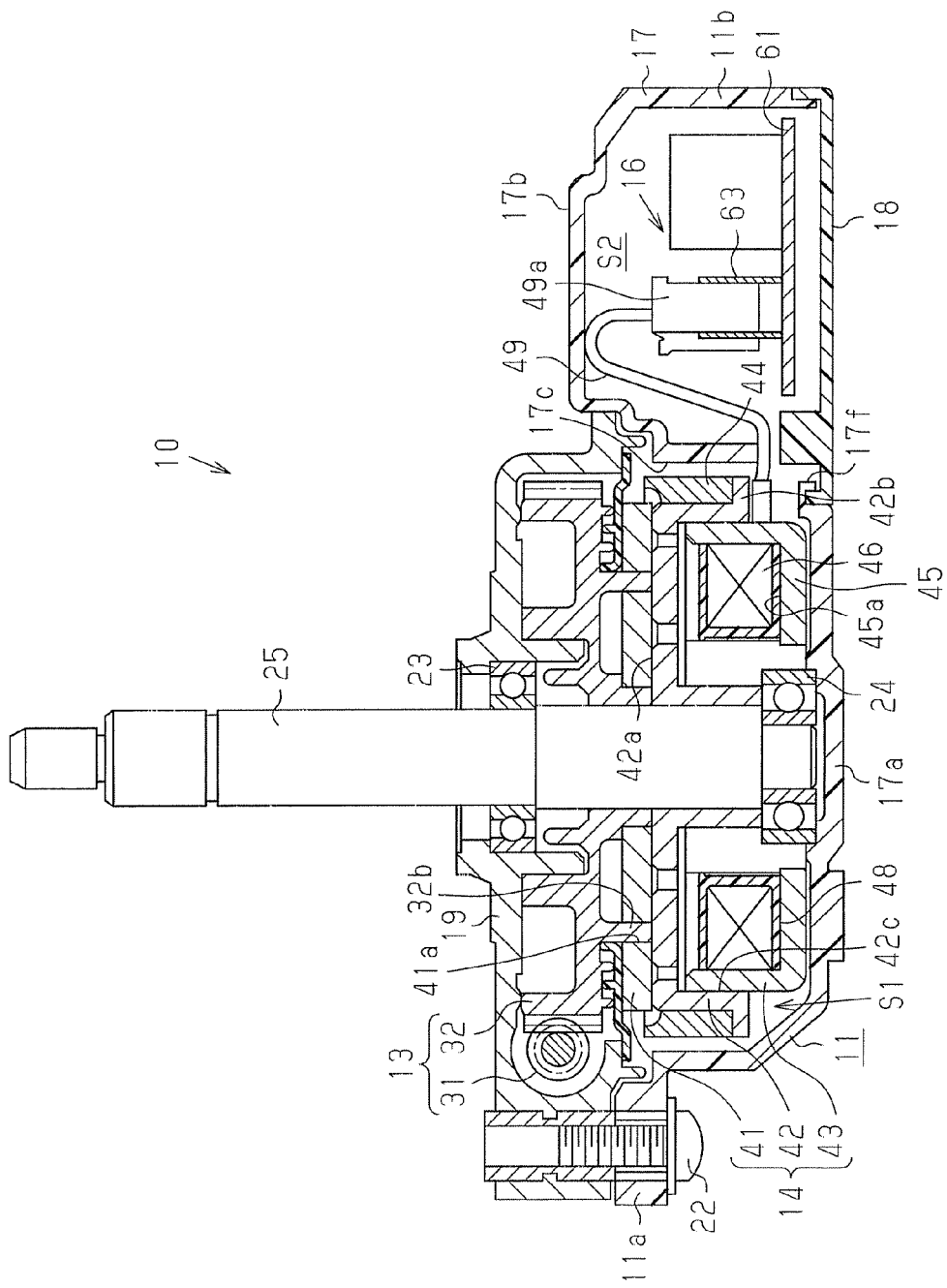
FIG. 3 is a cross-sectional view taken along line 3-3 in FIG. 1.

The case 17 is made of a resin material and provided with a first case portion 17a and a second case portion 17b in an integral manner. The first case portion 17a and the second case portion 17b are opened in the mutually opposing directions, in other words, respectively opened upward and downward as shown in FIG. 3, by which the case 17 has a cross section which is substantially in an S shape. The boundary between the first case portion 17a and the second case portion 17b forms a partition wall 17c extending in the axial direction of the motor 12 (FIG. 3). As described below, the first case portion 17a forms a first space S1 accommodating the electromagnetic clutch mechanism 14, and the second case portion 17b forms a second space S2 accommodating the ECU 16. These first and second spaces S1 and S2 are partitioned by the partition wall 17c.

The motor housing portion 19 is attached to the first case portion 17a to close the first space S1. The motor housing portion 19 and the first case portion 17a are fastened and fixed by screws 22 (refer to FIGS. 1 and 3) at three positions on their outer circumference. The motor housing portion 19 and the first case portion 17a form a first accommodating portion 11a of the housing 11.

The ECU cover 18 is composed of a resin material and attached to the second case portion 17b to close the second space S2. The ECU cover 18 and the second case portion 17b form a second accommodating portion 11b of the housing 11.

Figure 2:
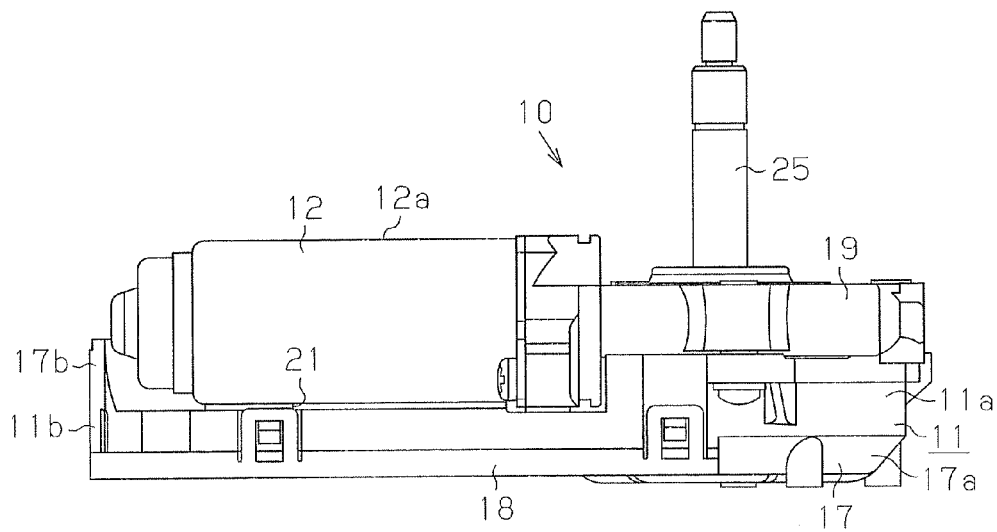
FIG. 2 is a front elevational view showing the drive device shown in FIG. 1.

The motor 12 is placed on the second case portion 17b via a cushion material 21 (refer to FIGS. 1 and 2). The motor 12 is provided with a yoke housing 12a. The yoke housing 12a is fastened at the motor housing portion 19, by which the motor 12 is fixed to the housing 11.

As shown in FIG. 3, the reduction mechanism 13 and the electromagnetic clutch mechanism 14 are accommodated in the first accommodating portion 11a. More specifically, a clutch shaft 25 is rotatably supported at the first accommodating portion 11a via bearings 23, 24. The clutch shaft 25 is provided with an axial end portion (distal end) projecting from the motor housing portion 19 so as to permit transmission of rotation with the outside. The reduction mechanism 13 is provided with a worm 31 fixed to the rotary shaft of the motor 12 and a worm wheel 32 meshing with the worm 31. The worm 31 is meshed with the worm wheel 32, by which the rotation speed of the motor 12 is reduced. The worm wheel 32 is supported at the axial middle portion of the clutch shaft 25 so as to rotate around and relative to the clutch shaft 25.

The electromagnetic clutch mechanism 14 is provided with an armature 41, a rotor 42 and an electromagnetic coil body 43. The armature 41 as a body to be attracted is supported around the clutch shaft 25 so as to rotate relative to the clutch shaft 25. In other words, the armature 41 is substantially rotatably supported in the housing 11 (first accommodating portion 11a) via the clutch shaft 25. The armature 41 is engaged with the worm wheel 32 to rotate integrally with the worm wheel 32.

In other words, a plurality of projections 32b extending in the axial direction are formed on a surface (lower surface shown in FIG. 3) of the worm wheel 32 opposing the armature 41. On the other hand, the armature 41 is formed in a disk shape by using a magnetic material (such as iron) and arranged at a position closer to the bearing 24 than the worm wheel 32. The armature 41 is provided with a plurality of engagement holes 41a that correspond to the projections 32b. The engagement holes 41a extend in the axial direction through the armature 41. The projections 32b are fitted into these engagement holes 41a, by which the armature 41 is coupled to the worm wheel 32 so as to rotate integrally with the worm wheel 32.

The rotor 42 as a rotating body is formed in a disk-like shape by using a magnetic material (such as iron) and equal with the armature 41 in outer diameter. The rotor 42 is arranged to face the armature 41 and fitted to the clutch shaft 25 so as to rotate integrally with the clutch shaft 25. A friction plate made of a magnetic material or a non-magnetic material is embedded in an opposing surface 42a, which is a surface of the rotor 42 opposing the armature 41. Therefore, the rotor 42 is capable of making frictional engagement with the armature 41 by using the friction plate. The rotor 42 makes frictional engagement with the armature 41, by which the electromagnetic clutch mechanism 14 is put into an engaged state. The rotor 42 ceases to make frictional engagement with the armature 41, by which the electromagnetic clutch mechanism is put into a disengaged state.

The rotor 42 is provided with an annular positioning flange 42b extending radially outward. A circular magnet 44 is attached and fixed on the outer circumference surface of the rotor 42. The magnet 44 is in contact with the positioning flange 42b and thereby positioned with respect to the rotor 42 in the axial direction. The magnet 44 rotates integrally with the rotor 42. The magnet 44 is provided with a plurality of magnetic poles. These magnetic poles include a south pole and a north pole alternately arranged along the magnet 44 in the circumferential direction.

Figure 5:
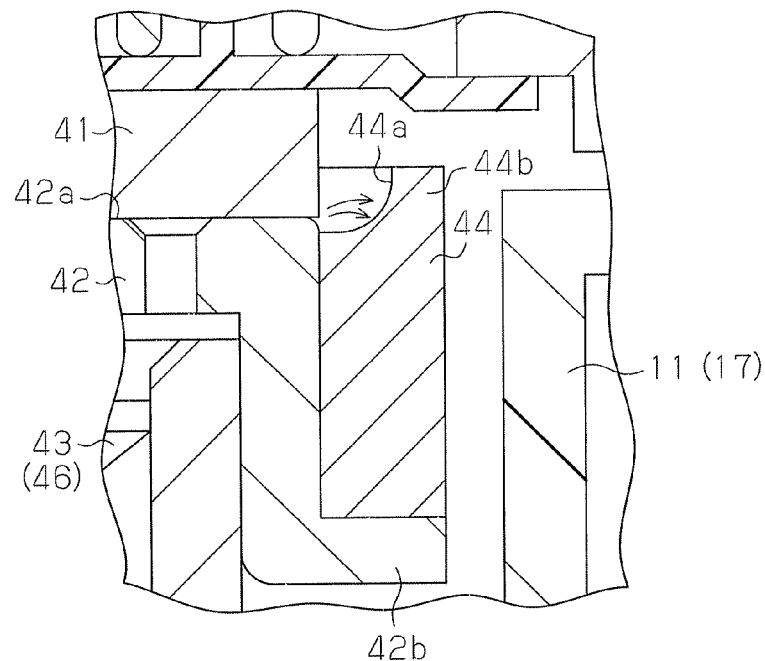
FIG. 5 is a partially enlarged cross-sectional view of FIG. 3.

FIG. 5 is a partially enlarged view of FIG. 3. As shown in FIG. 5, the magnet 44 of the present embodiment axially extends toward the worm wheel 32 than a surface (sliding surface) on which the armature is in contact with the rotor 42. The magnet 44 is provided with a circular recess 44a at a portion extending toward the worm wheel 32. The recess 44a is axially formed at one end of the inner circumference surface of the magnet 44. The recess 44a is formed over an axial range from an axial end of the magnet 44 to a position that is closer to the rotor 42 than a surface on which the armature 41 is in contact with the rotor 42. A portion of the magnet 44 corresponding to the recess 44a forms circular and annular wall portion 44b, which is spaced radially outward from the armature 41.

Abrasion powder of a magnetic material (such as iron) produced in association with actuation of the electromagnetic clutch mechanism 14 is attracted by the magnet 44 and also retained in the recess 44a, that is, a space between the outer circumference surface of the armature 41 and the annular wall portion 44b, by which the powder is prevented from being scattered. The abrasion powder includes powder resulting from a friction plate, metal powder from the armature 41 and metal powder from the rotor 42.

Figure 4:
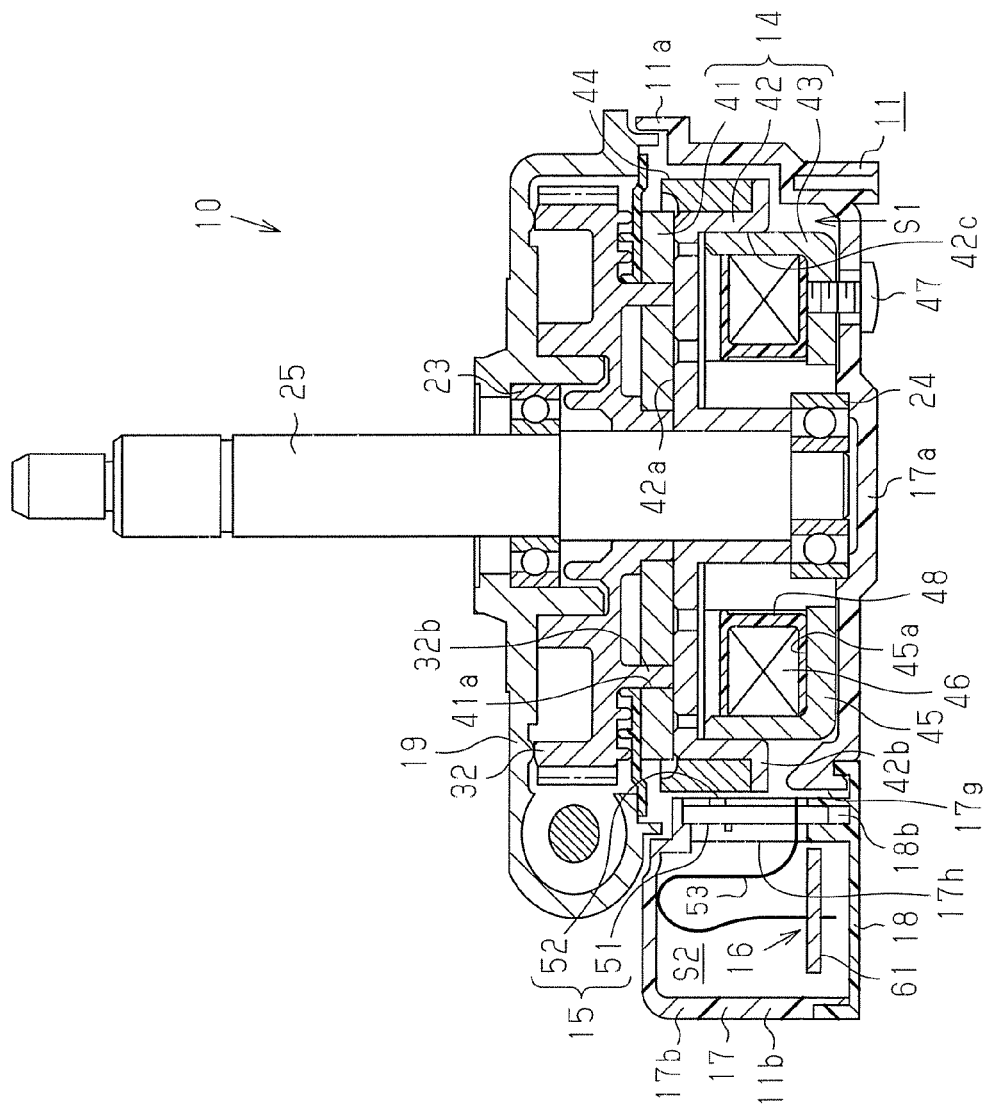
FIG. 4 is a cross-sectional view taken along line 4-4 in FIG. 1.

The electromagnetic coil body 43 is provided with a field core 45 and a coil 46, and opposed to the armature 41 in the axial direction with the rotor 42 in between. The field core 45 is formed in a circular shape by using a magnetic material and provided with a recess 45a opened toward the rotor 42. On the other hand, the rotor 42 is provided with an annular recess 42c opened toward the field core 45. The field core 45 is fastened and fixed to a first case portion 17a of the case 17 with a plurality of screws 47 (only one is shown in FIG. 4), while being arranged inside the recess 42c of the rotor 42. The coil 46 is wound about an annular bobbin 48 and fixed to the field core 45 in a state of being accommodated in the recess 45a of the field core 45. The end of the coil 46 is taken out from the recess 45*a* so as to extend through the field core 45 and electrically connected to a harness 49 (refer to FIG. 3).

The coil 46 receives supply of electricity from the outside via the harness 49. As shown in FIG. 3, a through hole 17*f* for allowing the harness 49 to pass through is formed on a partition wall 17*c* of the case 17. The harness 49 extending from the coil 46 of the electromagnetic clutch mechanism 14 accommodated in the first space S1 is introduced into a second space S2 through the through hole 17*f*. A terminal of the harness 49 is connected to a connector 49*a* arranged inside the second space S2.

As shown in FIG. 4, the sensor 15 is arranged to face the outer circumference surface of the magnet 44. In other words, a through hole 17*g* which allows the first space S1 and the second space S2 to communicate with each other is formed on the partition wall 17*c* of the case 17. The sensor 15 is provided with a hall IC substrate 51 and a hall IC 52 as a magnetism detecting element mounted on the hall IC substrate 51. The hall IC substrate 51 is arranged so as to close the through hole 17*g*, and the hall IC 52 is mounted on a surface exposed to the first space S1 of the hall IC substrate 51 and opposed to the surface of the magnet 44 (outer circumference surface). Both lateral edges@ of the hall IC substrate 51 (edges on both ends in the direction orthogonal to the sheet of FIG. 4) are inserted into a pair of retaining wall portions 17*h* (only one of them is shown in FIG. 4) formed on the case 17 and retained therein. In this state, a retaining wall portion 18*b* formed on the ECU cover 18 is in pressure contact with the hall IC substrate 51, by which the hall IC substrate 51 is retained between the case 17 and the ECU cover 18.

The sensor 15 is electrically connected to the ECU 16 by a flexible wire 53 extending from the hall IC substrate 51 to the second space S2. The sensor 15 and the magnet 44 constitute a rotation detector for detecting a rotating state of the rotor 42. In association with rotation of the rotor 42, a portion of the magnet 44 opposite to the sensor 15 is alternately changed in polarity between the south pole and the north pole. The sensor 15 outputs a signal corresponding to change in the polarity of the magnet 44 to the ECU 16 and then, the ECU 16 acquires the rotating state of the rotor 42 based on the signal.

The ECU 16 is accommodated and retained in the second space S2 (second accommodating portion 11*b*) and protected by the second space S2 which is closed by the ECU cover 18. This ECU 16 is provided with an ECU substrate 61 for mounting various types of electronic components. As shown in FIG. 3, the ECU substrate 61 is provided with a connector housing 63 to which the connector 49*a* is fitted and attached. The ECU 16 is electrically connected to the electromagnetic coil body 43 of the electromagnetic clutch mechanism 14 via the harness 49 extending from the connector 49*a*. The ECU 16 controls the supply/non-supply of electricity to the electromagnetic coil body 43, thereby the electromagnetic clutch mechanism 14 is driven and controlled.

The ECU 16 is electrically connected to the motor 12. The ECU 16 controls the supply/non-supply of electricity to the motor 12, thereby the motor 12 is driven and controlled.

As described above, in the present embodiment, the power transmitting mechanism portion (the reduction mechanism 13 and the electromagnetic clutch mechanism 14) is accommodated in the first accommodating portion 11*a* of the housing 11, and the ECU 16 is also accommodated in the second accommodating portion 11*b* of the housing 11. Therefore, the motor 12, the power transmitting mechanism portion, the sensor 15, and the ECU 16 are integrated into one unit.

Hereinafter, a description will be made for the operation of the drive device 10. When the ECU 16 controls the electromagnetic coil body 43 so as to be supplied with electricity, the electromagnetic coil body 43 generates a magnetic field to produce an electromagnetic attraction force between the armature 41 and the rotor 42. Accordingly, the armature 41 is attracted by the rotor 42. As a result, the armature 41 makes frictional engagement with the rotor 42, by which the electromagnetic clutch mechanism 14 is put into an engaged state. When the motor 12 is driven by the control of the ECU 16 in the engaged state, the worm wheel 32 is rotated and also the armature 41 rotates integrally with the worm wheel 32. The rotation of the armature 41 is transmitted to the rotor 42, which makes frictional engagement with the armature 41. Thereby, the rotor 42 is rotated, and the clutch shaft 25 is rotated with the rotor 42 accordingly.

On the other hand, when the ECU 16 controls the electromagnetic coil body 43 so as to be supplied with no electricity, the electromagnetic clutch mechanism 14 is put into a disengaged state. When an external force is applied to rotate the clutch shaft 25 in this state, the rotor 42 is rotated together with the clutch shaft 25. In this instance, the rotation of the rotor 42 is not transmitted to the armature 41 but the rotor 42 slips on the armature 41. Thereby, the external force allows the clutch shaft 25 to smoothly rotate.

As described above in detail, according to the present embodiment, the following advantages are obtained.

(1) In the present embodiment, the magnet 44 is provided with the annular wall portion 44*b* extending in the axial direction toward the armature 41 beyond the surface (sliding surface) on which the armature 41 is in contact with the rotor 42. In other words, the magnet 44 extends across the surface (sliding surface) on which the armature 41 is in contact with the rotor 42 with respect to the axial direction. Then, the annular wall portion 44*b* is spaced radially outward from the armature 41. Therefore, abrasion powder of magnetic material (such as iron) resulting from actuation of the electromagnetic clutch mechanism 14 is attracted by the magnet 44 and also retained in the space (the recess 44*a*) formed between the armature 41 and the annular wall portion 44*b*, so that the abrasion powder is prevented from being scattered. In other words, the annular wall portion 44*b* performs functions of attracting the abrasion powder and also functions as a dike for preventing the abrasion powder from being scattered outside. It is, therefore, possible to prevent the abrasion powder from being scattered toward the sensor 15 (for example, toward the hall IC substrate 51) and also prevent the sensor 15 from causing a short-circuit breakdown, etc. Furthermore, it is possible to prevent the abrasion powder from being scattered toward the ECU 16 to enter the ECU 16 and also prevent a short-circuit breakdown of the ECU 16.

(2) In the present embodiment, the annular wall portion 44*b* is spaced radially outward from the armature 41 due to the presence of the recess 44*a* which is dented radially outward from the inner circumference surface of the magnet 44. In other words, the recess 44*a* is formed at a portion of the inner circumference surface of the magnet 44 which is opposed in the radial direction to the outer circumference surface of the armature 41, so that the annular wall portion 44*b* is spaced radially outward from the armature 41. Therefore, the armature 41 can be made equal to the rotor 42 in outer diameter (in other words, the inner diameter of the portion of the magnet 44 other than the annular wall portion 44*b*), so that the armature 41 is capable of contacting the entire opposing surface 42*a* of the rotor 42. Therefore, it is possible to maximize the size of the area at which the armature 41 makes frictional engagement with the rotor 42 and also improve the capacity in transmitting power between the armature 41 and the rotor 42.

(3) In the present embodiment, since it is possible to prevent short-circuit breakdown of the ECU 16, on which important and delicate components such as a micro computer are mounted, the drive device 10 is improved in reliability.

(4) In the present embodiment, the electromagnetic clutch mechanism 14, the sensor 15, and the ECU 16 are accommodated in the housing 11 (the case 17, the ECU cover 18, and the motor housing portion 19) and integrated into one unit. Therefore, it is possible to allow these components 14, and 16 to be fitted in a compact space, which facilitates the installation of the drive device 10.

The above embodiment may be modified as follows.

Figure 6:
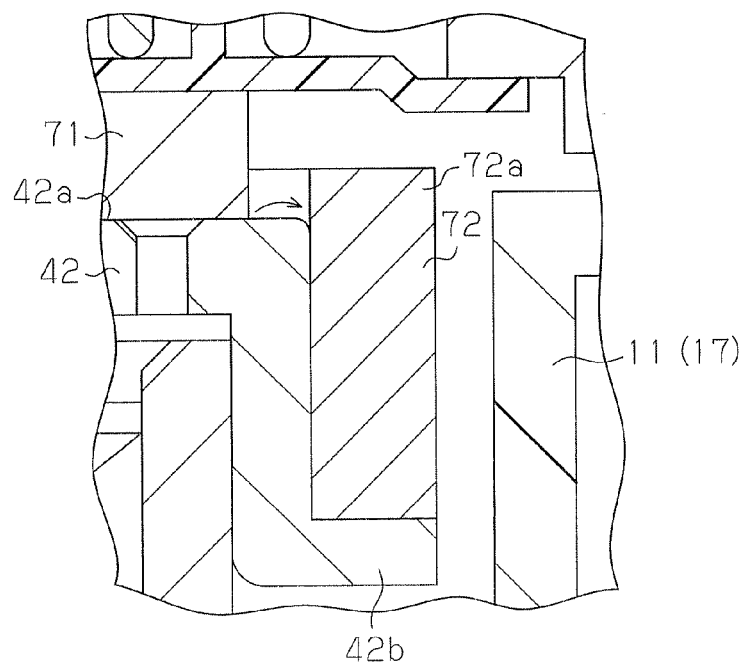
FIG. 6 is a partial cross-sectional view of a modified embodiment of the present invention.

As shown in FIG. 6, an armature 71 smaller in outer diameter than the rotor 42 may be employed to eliminate the necessity for forming the recess 44*a* shown in FIG. 5 on a circular magnet 72 which is attached and fixed on the outer circumference surface of the rotor 42. A portion of the magnet 72 that portion extends axially toward the armature 71 beyond a surface (sliding face) on which the armature 71 is in contact with the rotor 42 forms a circular projection 72*a*. The projection 72*a* forms an annular wall portion which is spaced radially outward from the armature 71. In other words, a part of the magnet 72 having a constant inner diameter all across the axial direction forms the projection 72*a*, which functions as an annular wall portion for preventing the abrasion powder from being scattered. This facilitates the manufacture of the magnet 72.

A magnetism detecting element other than the hall IC 52 may be employed as a detection element.

In the above-described embodiment, the friction plate may be embedded into the armature 41 in place of the rotor 42. Furthermore, frictional engagement of the rotor 42 with the armature 41 does not necessarily require the friction plate.

The invention claimed is:

1. A drive device comprising:
   a housing;
   an electromagnetic clutch mechanism which is accommodated in the housing, wherein the electromagnetic clutch mechanism is provided with a body to be attracted which is rotatably supported in the housing, a rotating body which is arranged to face the body to be attracted and also rotatably supported in the housing, and a coil, and wherein, in association with electricity supplied to the coil, an electromagnetic attraction force is generated between the body to be attracted and the rotating body, thereby the body to be attracted makes frictional engagement with the rotating body so that a power is transmitted between the body to be attracted and the rotating body;
   an annular magnet fixed on the outer circumference surface of the rotating body, wherein the annular magnet is provided with a plurality of magnetic poles arranged along the circumferential direction; and
   a sensor retained in the housing at a position radially outward of the annular magnet, wherein the sensor is arranged to face the annular magnet and detects a polarity change of the annular magnet in association with the rotation of the rotating body,
   wherein the annular magnet is provided with an annular wall portion extending toward the body to be attracted beyond a surface on which the body to be attracted is in contact with the rotating body with respect to the axial direction, wherein the annular wall portion has an inner circumference surface facing the body to be attracted in the radial direction, wherein a concave recess is formed on the inner circumference surface of the annular wall portion that is indented radially outward from the inner circumference surface of the annular magnet such that the annular wall portion is radially spaced outward from the body to be attracted, and wherein the concave recess is configured to retain abrasion powder which is produced in association with actuation of the electromagnetic clutch mechanism and is attracted by the annular magnet.

2. The drive device according to claim 1, further comprising a controller accommodated in the housing to control the electromagnetic clutch mechanism.

3. The drive device according to claim 1, wherein the body to be attracted is the same as the rotating body in outer diameter.

4. The drive device according to claim 1, wherein the body to be attracted is smaller in outer diameter than the rotating body.

5. The drive device according to claim 1, wherein a portion of the annular magnet that corresponds to the recess is larger in inner diameter than the remainder of the annular magnet.

* * * * *